னai# 2,826,594

SULFAMOYLSULFANILAMIDES AND METHOD OF PREPARING THE SAME

Paul F. Dreisbach, Somerville, N. J., assignor to American Cyanamid Company, New York, N. Y., a corporation of Maine No Drawing. Application September 27, 1955
Serial No. 537,027

14 Claims. (Cl. 260—397.7)

This invention relates to new organic compounds. More particularly, it relates to dialkylsulfamoylsulfanilamides and method of preparing the same.

Sulfonamides, and particularly derivatives of sulfanilamide, constitute an important class of compounds for use in the therapy of infectious diseases, and a very wide variety of these compounds has been prepared in the past. Among the known sulfanilamide derivatives which have been prepared are various $N^4$-acyl derivatives of the sulfa drugs. For example, the $N^4$-acetyl derivatives of sulfanilamides are often used in the intermediate stage of manufacture of various derivatives. Other types of $N^4$-acyl derivaties of sulfanilamides are also known, such as the carbamoyl derivative, etc.

The compounds of the present invention differ from any of the known compounds and can be illustrated by the following general formula:

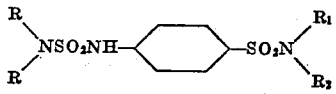

in which R is an alkyl radical, $R_1$ is hydrogen or an alkyl radical and $R_2$ is hydrogen, or an alkyl, amidino or heterocyclic radical. The alkyl radicals of $R_1$ and $R_2$ can be methyl, ethyl, propyl, butyl, amyl, hexyl, etc., radicals. The amidino radical can be radicals such as guanyl and the like. The heterocyclic radicals can be pyrimidyl, thiazolyl, pyridyl, piperazyl, pyridazyl and the like.

The compounds of the present invention are, in general, light tan to white, crystalline solids with relatively high melting points. They are, for the most part, slightly soluble in water and somewhat soluble in organic solvents.

The compounds of this invention are conveniently prepared by the reaction of the acid chloride of an N,N-dialkylsulfamic acid with a sulfanilamide derivative. The acid chlorides are represented by the formula $R_2NSO_2Cl$, and are usually referred to as dialkylsulfamoyl chlorides (or sulfamyl chlorides). Dialkylsulfamoyl chlorides where the alkyl group is methyl, ethyl, propyl, butyl, etc., are used in the preparation. The sulfanilamide derivatives used in the preparation of the products include sulfanilamide itself and various other $N^1$-substituted sulfanilamides, such as sulfadiazine, sulfathiazole, sulfapyridine, sulfaguanidine; $N^1$-alkyl sulfanilamides, such as $N^1$-methyl-sulfanilamide, $N^1$-ethyl-sulfanilamide, $N^1$-butyl-sulfanilamide, $N^1,N^1$-dimethyl-sulfanilamide, $N^1,N^1$-diethyl-sulfanilamide, and the like.

The preparation of the compounds is carried out by reaction of the sulfanilamide derivative with at least an equivalent amount of the dialkylsulfamoyl chloride in the presence of a solvent such as pyridine as an acid acceptor. Other solvents, such as benzene, are sometimes used as diluents in the reaction mixture. The reactants are heated with stirring at the refluxing temperatures of the solvent until the reaction is substantially complete. The temperature may be from 80° C. to 150° C. The products are then isolated by the usual methods, such as filtration, extraction, etc.

Products of the present invention have anti-convulsant activity in tests used to detect active compounds for use in treatment of such disorders as epilepsy. The $N^4$-dialkylsulfamoyl derivatives of sulfanilamide itself are of particular interest in this respect. Compounds of this type have shown good results in these tests. One such test, which has been used for the compounds, is the supramaximal electro-shock test (corneal electro-shock).

In the electro-shock test, rats dosed with the compound to be tested are subjected to the effects of an electric current administered by corneal electrodes; the number of animals protected is noted. Abolition of the tonic extensor reflex of the hind limbs is the criterion of protection. The compounds are rated from 1+ to 4+ denoting the degree of activity based on the number of animals protected. The rating 4+ denotes that 100% of the animals are protected and is the highest possible rating for the test.

Test results on dialkylsulfamoyl sulfanilamides are as follows:

TABLE I

N,N-dimethylsulfamoyl sulfanilamide

[Corneal electro-shock (supramaximal).]

| | |
|---|---|
| 25 mg./kg. | ++ |
| 100 mg./kg. | ++++ |

N,N-diethylsulfamoyl sulfanilamide

| | |
|---|---|
| 15 mg./kg. | +++ |
| 30 mg./kg. | ++ |
| 25 mg./kg. | ++ |
| 100 mg./kg. | +++ |

The following examples illustrate in greater detail the process of the present invention and the products resulting therefrom.

EXAMPLE 1

A mixture of 324 parts of dimethylamine hydrochloride and 665 parts of sulfuryl chloride is heated to the reflux temperature with stirring. An additional 415 parts of sulfuryl chloride is added during the refluxing period. The refluxing is continued until the reaction is substantially complete. The mixture is then cooled and drowned in 800 parts of ice and water. The oily layer which forms is separated. The water layer is further extracted with diethyl ether and the ether washes are combined with the oily layer. The resulting ether solution is washed with sodium bicarbonate solution and again with water and then dried. The ether is removed by distillation and the residual oil is distilled under reduced pressure, giving the product, dimethylsulfamoyl chloride, in the form of a colorless liquid.

To a mixture of 25.8 parts of sulfanilamide and 12.5 parts of pyridine, heated with stirring on the steam bath, is added 216 parts of dimethylsulfamoyl chloride. The mixture immediately becomes a bright red and the color then fades to a pale yellow. Heating is continued until the reaction is substantially complete. The viscous yellow reaction mixture is then cooled and washed with 115 parts of benzene. The benzene is decanted from the yellow solid which forms and the yellow solid is extracted with dilute hydrochloric acid to remove residual pyridine. The product is purified from 150 parts of hot water, giving a solid material with a melting point of 152–155° C. This is soluble in dilute caustic solution. After a second recrystallization from water, the white crystalline product, $N^4$-dimethylsulfamoylsulfanilamide, melts at 153–156° C.

EXAMPLE 2

To a hot slurry of 57.4 parts of sulfanilamide and 40 parts of hot pyridine is added 46.6 parts of diethylsulfamoyl chloride. The solid dissolves to form a brown solution. The mixture is stirred and heated until the reaction is substantially complete. On cooling, a viscous liquid results, which is washed twice with benzene and then with 200 parts of water containing 15 parts of 5 N hydrochloric acid. A dark oil forms in the acid mixture, which, on stirring, solidifies to a gray solid which is removed by filtration. The product, $N^4$-diethylsulfamoylsulfanilamide, is purified by recrystallization from 750 parts of boiling water. 37.4 g. of product is obtained having a melting point of 158–159.7° C.

EXAMPLE 3

The procedure of Example 2 is used, except that an equivalent quantity of dipropylsulfamoyl chloride is used in place of the diethylsulfamoyl chloride. A 10% yield of product, $N^4$-dipropylsulfamoylsulfanilamide, purified from aqueous methanol shows a melting point of 139.5 to 141° C.

EXAMPLE 4

The procedure of Example 2 is followed, except that an equivalent quantity of $N^1$-butylsulfanilamide is used in place of the sulfanilamide, and an equivalent quantity of dimethylsulfamoyl chloride is used in place of the diethylsulfamoyl chloride. A 37.3% yield of $N^4$-dimethylsulfamoyl-$N^1$-butylsulfanilamide was obtained. Purified from 70% aqueous ethanol, the product melted at 91.1 to 92.5° C.

EXAMPLE 5

The procedure of Example 2 is used, except that an equivalent quantity of dimethylsulfamoyl chloride is used in place of the diethylsulfamoyl chloride and an equivalent quantity of $N^1,N^1$-dimethylsulfanilamide is used in place of the sulfanilamide. A 12.5% yield of $N^4$-dimethylsulfamoyl-$N^1,N^1$-dimethylsulfanilamide was obtained. Recrystallized from anhydrous alcohol it shows a melting point of 165.3 to 167.3° C.

EXAMPLE 6

To a mixture of 35 parts of benzene and 28 parts of pyridine is added 23.2 parts of sulfaguanidine. There is then added 17.2 parts of dimethylsulfamoyl chloride with stirring, and the whole is heated to the reflux temperature with stirring until the reaction is substantially complete. The mixture is allowed to cool, resulting in the formation of two liquid layers. The benzene layer is removed and the oily layer is rubbed up with 150 parts of water, which causes formation of yellow solid product. The crystallization of this solid from 400 parts of water gives the product in the form of a very slightly yellowish, crystalline precipitate of $N^4$-dimethylsulfamoyl-sulfaguanidine($N^4$-dimethylsulfamoyl-$N^1$-guanylsulfanilamide) with a melting point of 218–219° C. This may be further purified by recrystallization from hot water.

EXAMPLE 7

To a solution of 35 parts of benzene and 28 parts of pyridine is added 23.2 parts of sulfaguanidine. To the mixture with stirring is then added 20.6 parts of diethylsulfamoyl chloride, and the whole is heated at the reflux temperature until the reaction is substantially complete. During the heating period, the mixture turns an orange color and an oil layer starts to form within a short time. The mixture is then cooled to room temperature, and the top benzene layer is removed and discarded. The oily layer is stirred and rubbed up with 150 parts of water, causing formation of a solid precipitate which is removed by filtration. This is recrystallized from about 700 parts of water, giving the product in the form of a white solid with a melting point of 200–210° C. This product is less soluble in water than the corresponding dimethyl derivative. It is easily soluble in caustic solution or ammonium hydroxide solution. The heating period here was about 1½ hours. Before recrystallization from water the product melted at about 199–200° C. in rapid heating. The product may also be recrystallized from aqueous solution in the ratio of one liter of water with 170 ml. of 95% alcohol. A 39% yield of purified $N^4$ - diethylsulfamoyl - sulfaguanidine($N^4$ - dimethylsulfamoyl-$N^1$-guanylsulfanilamide) is obtained.

EXAMPLE 8

To a hot slurry of 50.2 parts of sulfadiazine and 50 parts of pyridine is added 30 parts of dimethylsulfamoyl chloride. The mixture is heated on a steam bath with stirring until the reaction is substantially complete, during which time all of the solid dissolves. The viscous reaction solution is then cooled and washed with benzene (200 parts), resulting in a yellow solid. This material is purified by recrystallization from aqueous alcohol giving a white product with a melting point of 194–196° C. The heating period here was somewhat over an hour. The product, $N^4$-dimethylsulfamoylsulfadiazine($N^4$-dimethylsulfamoyl-$N^1$-(2-pyrimidyl)-sulfanilamide), may also be purified by precipitation from solution in dilute sodium hydroxide.

EXAMPLE 9

A slurry of 30 parts of sulfathiazole in 60 parts of benzene and 35 parts of pyridine is heated on the steam bath, with stirring. Seventeen parts of dimethylsulfamoyl chloride is added to the slurry and the whole is heated until the reaction is substantially complete. Two oily layers result. The lower orange-colored layer is removed and washed twice with water, whereupon a yellow solid forms, which is removed by filtration and recrystallized from aqueous alcohol, giving the product in the form of a white solid with a melting point of 187–189° C. This product contains one mole of ethanol of crystallization which may be removed by heating at 100° C. Analysis of the material dried at 100° C. for 1½ hours gave acceptable values for the alcohol-free product. The product, $N^4$-dimethylsulfamoylsulfathiazole($N^4$-dimethylsulfamoyl-$N^1$-(2-thiazolyl)-sulfanilamide), may also be recrystallized from aqueous dioxane, giving a product containing ½ mole of dioxane of crystallization which may be removed by drying at 100° C. for 40 hours.

EXAMPLE 10

To 50 parts of pyridine is added 50 parts of sulfapyridine. This is heated on the steam bath and to the hot paste is added 30 parts of dimethylsulfamoyl chloride. This mixture is then heated with stirring until the reaction is substantially complete. During the heating period all of the solid material dissolves. Some yellow solid material separates on cooling and the whole is extracted with benzene. The yellow solid which forms is removed by filtration and washed with dilute hydrochloric acid and hot water. The remaining solid is then recrystallized from 33% aqueous alcohol, forming a cream-colored, crystalline material with a melting point of 187–189° C. The reaction period here was about 45 minutes. 38% yield of $N^4$-dimethylsulfamoylsulfapyridine($N^4$-dimethylsulfamoyl-$N^1$-(2-pyridyl)-sulfanilamide) was obtained.

I claim:
1. A compound having the formula

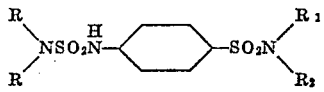

in which R is a lower alkyl radical $R_1$ is a member of the group consisting of hydrogen and lower alkyl radicals and $R_2$ is a member of the group consisting of hydrogen, lower alkyl, amidino and heteromonocyclic radical wherein the bond from the $N^1$ nitrogen of the sulfamilamide is to a carbon atom adjacent to a nitrogen atom in the heteromonocyclic ring.
2. $N^4$-di(lower alkyl)sulfamoylsulfanilamides.
3. $N^4$-dimethylsulfamoylsulfanilamide.
4. $N^4$-diethylsulfamoylsulfanilamide.
5. $N^4$-dipropylsulfamoylsulfanilamide.

6. $N^4$-dimethylsulfamoyl-$N^1$-butylsulfanilamide.
7. $N^4$-dimethylsulfamoyl-$N^1,N^1$-dimethylsulfanilamide.
8. A method of preparing compounds having the formula

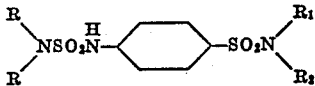

in which R is a lower alkyl radical, $R_1$ is a member of the group consisting of hydrogen and lower alkyl radicals and $R_2$ is a member of the group consisting of hydrogen, lower alkyl, amidino and heteromonocyclic radical wherein the bond from the $N^1$ nitrogen of the sulfanilamide is to a carbon atom adjacent to a nitrogen atom of the heteromonocyclic ring which comprises heating a sulfanilamide having the formula

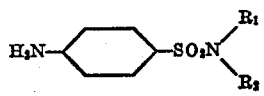

in which $R_1$ and $R_2$ are as defined above with a dialkylsulfamoyl halide.

9. A method of preparing $N^4$-di(lower alkyl)sulfamoylsulfanilamides which comprises heating sulfanilamide with di(lower alkyl)sulfamoyl chloride.

10. A method of preparing $N^4$-dimethylsulfamoylsulfanilamide which comprises heating sulfanilamide with dimethylsulfamoyl chloride.

11. A method of preparing $N^4$-diethylsulfamoyl sulfanilamide which comprises heating sulfanilamide with diethylsulfamoyl chloride.

12. A method of preparing $N^4$-dipropylsulfamoyl sulfanilamide which comprises heating sulfanilamide with dipropylsulfamoyl chloride.

13. A method of preparing $N^4$-dimethylsulfamoyl-$N^1$-butylsulfanilamide which comprises heating $N^1$-butylsulfanilamide with dimethylsulfamoyl chloride.

14. A method of preparing $N^4$-dimethylsulfamoyl-$N^1,N^1$-dimethylsulfanilamide which comprises heating $N^1$-dimethylsulfanilamide with dimethylsulfamoyl chloride.

No references cited.